US012359467B1

(12) United States Patent
Li et al.

(10) Patent No.: US 12,359,467 B1
(45) Date of Patent: Jul. 15, 2025

(54) LOCKSET FOR LOCKING DOOR LEAF

(71) Applicant: Meta Intelligence LLC, Dover, DE (US)

(72) Inventors: Jun Li, Zhongshan (CN); Jian Chen, Zhongshan (CN); Junquan Lin, Zhongshan (CN); Xifeng Wang, Zhongshan (CN)

(73) Assignee: META INTELLIGENCE LLC, Dover, DE (US)

( * ) Notice: Subject to any disclaimer, the term of this patent is extended or adjusted under 35 U.S.C. 154(b) by 0 days.

(21) Appl. No.: 18/937,071

(22) Filed: Nov. 5, 2024

(30) Foreign Application Priority Data

Mar. 29, 2024 (CN) ......................... 202410385947.2

(51) Int. Cl.
*E05B 47/00* (2006.01)
*E05B 47/06* (2006.01)
(Continued)

(52) U.S. Cl.
CPC .......... *E05B 47/0012* (2013.01); *E05B 47/06* (2013.01); *E05B 59/00* (2013.01);
(Continued)

(58) Field of Classification Search
CPC .... E05B 17/04; E05B 17/042; E05B 47/0012; E05B 47/06; E05B 47/0603; E05B 47/0615; E05B 47/0661; E05B 59/00; E05B 63/0056; E05B 63/0065; E05B 63/0069; E05B 63/08; E05B 63/143; E05B 63/16; E05B 2047/0017; E05B 2047/002;
(Continued)

(56) References Cited

U.S. PATENT DOCUMENTS 5,963,657 A * 10/1999 Bowker .................... G07C 9/37
340/5.53
2004/0213440 A1* 10/2004 Joo ........................ G06V 40/40
382/124
(Continued)

FOREIGN PATENT DOCUMENTS

CA 2249802 A1 * 4/2000 ........... E05B 15/004
CN 110706384 A * 1/2020 ............. E05B 49/00
(Continued)

*Primary Examiner* — Christine M Mills
*Assistant Examiner* — Peter H Watson
(74) *Attorney, Agent, or Firm* — Bayramoglu Law Offices LLC

(57) ABSTRACT

A lockset for locking a door leaf includes a first lock bolt, a second lock bolt, a first electric driver, and a lever component. The lever component is configured to tilt around a fulcrum, and the lever component comprises an inner end and an outer handle. The inner end of the lever component is drivingly connected to the second lock bolt. The outer handle of the lever component is configured to receive a pressing action of a hand. When the outer handle of the lever component is pressed, the lever component tilts, allowing the inner end to drive the second lock bolt to retract. The outer handle of the lever component is provided with a pickup device for picking up a biological signal of a finger. The pickup device is in electrical signal connection with a controller. The controller is configured to control the first electric driver to operate.

20 Claims, 11 Drawing Sheets

(51) Int. Cl.
*E05B 59/00* (2006.01)
*E05B 63/14* (2006.01)

(52) U.S. Cl.
CPC .... *E05B 63/143* (2013.01); *E05B 2047/0017* (2013.01); *E05B 2047/002* (2013.01); *E05B 2047/0094* (2013.01)

(58) Field of Classification Search
CPC ..... E05B 2047/0056; E05B 2047/0094; E05B 35/00; E05B 2035/009; G07C 9/00563
See application file for complete search history.

(56) References Cited

U.S. PATENT DOCUMENTS

| | | | | |
|---|---|---|---|---|
| 2005/0156439 | A1* | 7/2005 | Furlong | E05B 9/08 292/336.3 |
| 2016/0115720 | A1* | 4/2016 | Wong | E05B 15/02 49/506 |
| 2016/0168887 | A1* | 6/2016 | Huang | E05C 1/14 292/138 |
| 2016/0183812 | A1* | 6/2016 | Zhang | G07C 9/37 600/301 |
| 2018/0283051 | A1* | 10/2018 | Qiu | G06K 19/0723 |
| 2019/0006875 | A1* | 1/2019 | Bien | E05B 47/00 |
| 2020/0002977 | A1* | 1/2020 | Russi-Vigoya | E05B 39/04 |
| 2020/0149317 | A1* | 5/2020 | Seacat | E05B 9/02 |
| 2024/0249576 | A1* | 7/2024 | Hou | G07C 9/00 |

FOREIGN PATENT DOCUMENTS

| | | | | | |
|---|---|---|---|---|---|
| CN | 111710066 | A | | 9/2020 | |
| KR | 20230050606 | A | * | 4/2023 | E05B 63/22 |
| WO | WO-2014021672 | A1 | * | 2/2014 | E05B 47/0673 |

* cited by examiner

LOCKSET FOR LOCKING DOOR LEAF

CROSS REFERENCE TO THE RELATED APPLICATIONS

This application is based upon and claims priority to Chinese Patent Application No. 202410385947.2, filed on Mar. 29, 2024, the entire contents of which are incorporated herein by reference.

TECHNICAL FIELD

The present disclosure relates to a lockset for locking a door leaf, and in particular to a lockset with two lock bolts that both retract to unlock the door leaf.

BACKGROUND

The anti-theft performance of locksets is one of the most important concerns for people. In order to improve the anti-theft performance of the lockset, the lockset is usually provided with at least two independent lock bolts, and each lock bolt is provided with an independent unlocking command input device. The unlocking command input device can be a handle, or a biological information acquisition device, etc. For example, Patent CN202010625267.5 provides a wireless-controlled smart fingerprint lockset. The smart fingerprint lockset includes a main lock, a secondary lock, and an access control system for controlling the open and closed states of the main lock and the secondary lock. The main lock includes a main lock body with a latch bolt, a latch bolt limiting module, and inner and outer handles provided at two sides of the main lock body for controlling the latch bolt to extend and retract. The secondary lock includes a secondary lock body with a dead bolt and a dead bolt control module for controlling the dead bolt to extend and retract. The access control system includes an identity verification device and an output module. The output module is wirelessly connected to the latch bolt limiting module and the dead bolt control module, respectively. In a feasible implementation, the output module is wirelessly connected to the dead bolt control module via Bluetooth, wireless fidelity (WiFi), or infrared (IR). The output module is wirelessly connected to the latch bolt limiting module via Bluetooth, WiFi, or IR. The identity verification device is configured to verify the user's identity and send an unlocking command to the output module after the verification is passed. The output module sends the received unlocking command to the latch bolt limiting module and the dead bolt control module, respectively. The latch bolt limiting module unlocks the latch bolt based on the received unlocking command, allowing the user to control the latch bolt to extend and retract by rotating the outer handle. Meanwhile, the dead bolt control module controls the dead bolt to retract based on the received unlocking command so as to unlock the secondary lock, ultimately completing the door opening operation, allowing the user to enter room. Through the above method, when the identity verification is passed, the dual lock bodies can be unlocked, which is convenient and fast. The dual lock bodies improve the security and reliability of the smart fingerprint lockset. However, the unlocking solution proposed by the above technical solution is completely useless in situations where the outer handle cannot be turned or rotated. In view of this, in order to adapt to different application scenarios, it is necessary to propose another completely different unlocking solution.

SUMMARY

In view of the defects in the prior art, the present disclosure proposes a lockset for locking a door leaf, including: two lock bolts: a first lock bolt and a second lock bolt, where when the first lock bolt and the second lock bolt retract, the door leaf is unlocked; and a first electric driver, where when the first electric driver operates, the first lock bolt is driven to retract; the lockset further includes a lever component that is operated outside the door leaf to retract the second lock bolt; the lever component is configured to tilt around a fulcrum, and includes an inner end and an outer handle; the inner end is drivingly connected to the second lock bolt; the outer handle is configured to receive a pressing action of a hand; the outer handle is provided with a pickup device for picking up a biological signal of a finger; the pickup device is in electrical signal connection with a controller; the controller is configured to control the first electric driver to operate; when the finger exerts the pressing action such that the lever component tilts to retract the second lock bolt, the pickup device synchronously picks up the biological signal of the finger that exerts the pressing action; and when the picked up biological signal of the finger is determined as an authorized signal, the controller controls the first electric driver to operate to drive the first lock bolt to retract, thereby unlocking the door leaf.

According to the above technical solution, the present disclosure has the following technical advantages over the prior art. Firstly, unlike the unlocking method by a rotating handle in the prior art, the lever component provided by the present disclosure provides a tilting unlocking method, which is suitable for application scenarios of fixed handles. Secondly, the outer handle of the lever component is provided with a pickup device for picking up the biological signal of the finger. When the lever component is pressed with the finger, the pickup device picks up the biological signal of the finger that exerts the pressing action. By completing two tasks in one step, the present disclosure greatly simplifies the unlocking operation and improves unlocking convenience.

The present disclosure incorporates the above characteristics and advantages into the lockset for locking a door leaf.

DETAILED DESCRIPTION OF THE EMBODIMENTS

The technical solution of the structure of a lockset for locking a door leaf provided by the present disclosure is described in further detail below according to the drawings. The various detailed implementation solutions disclosed below may be selectively applied or combined in one embodiment, even if they are not directly related or synergistic in function, unless explicitly stated to be equivalent or alternative implementation solutions.

Figure 1:
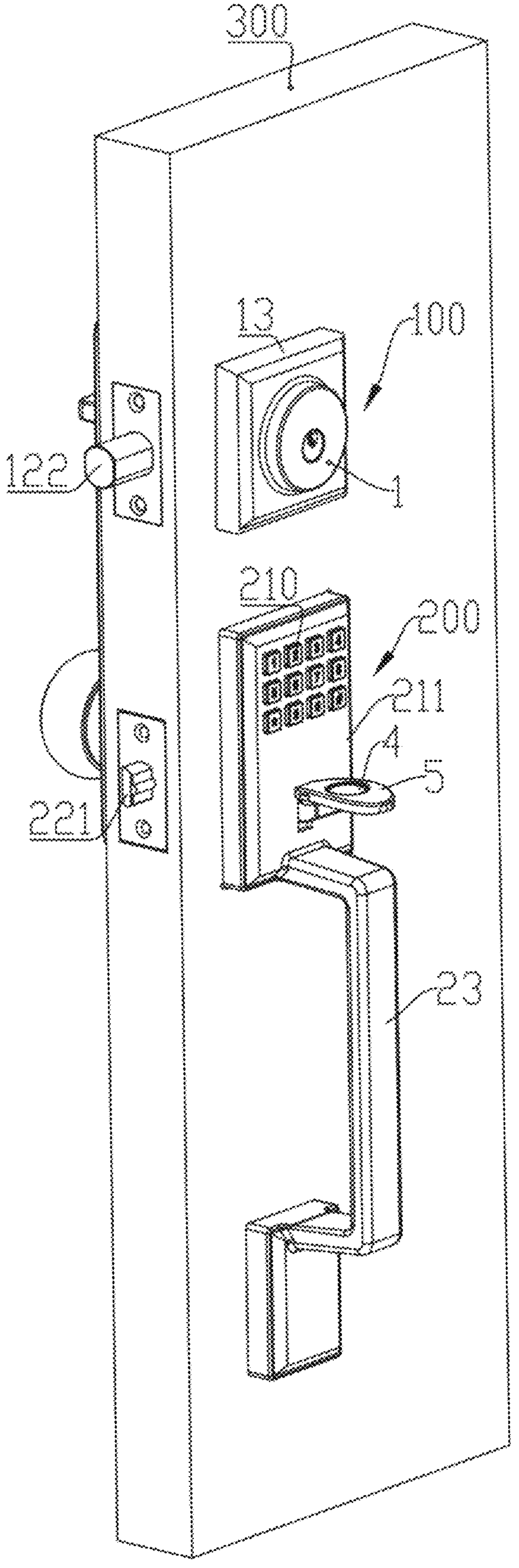
FIG. 1 is a three-dimensional structural diagram of a lockset for locking a door leaf based on a technical solution of the present disclosure.
Figure 2:
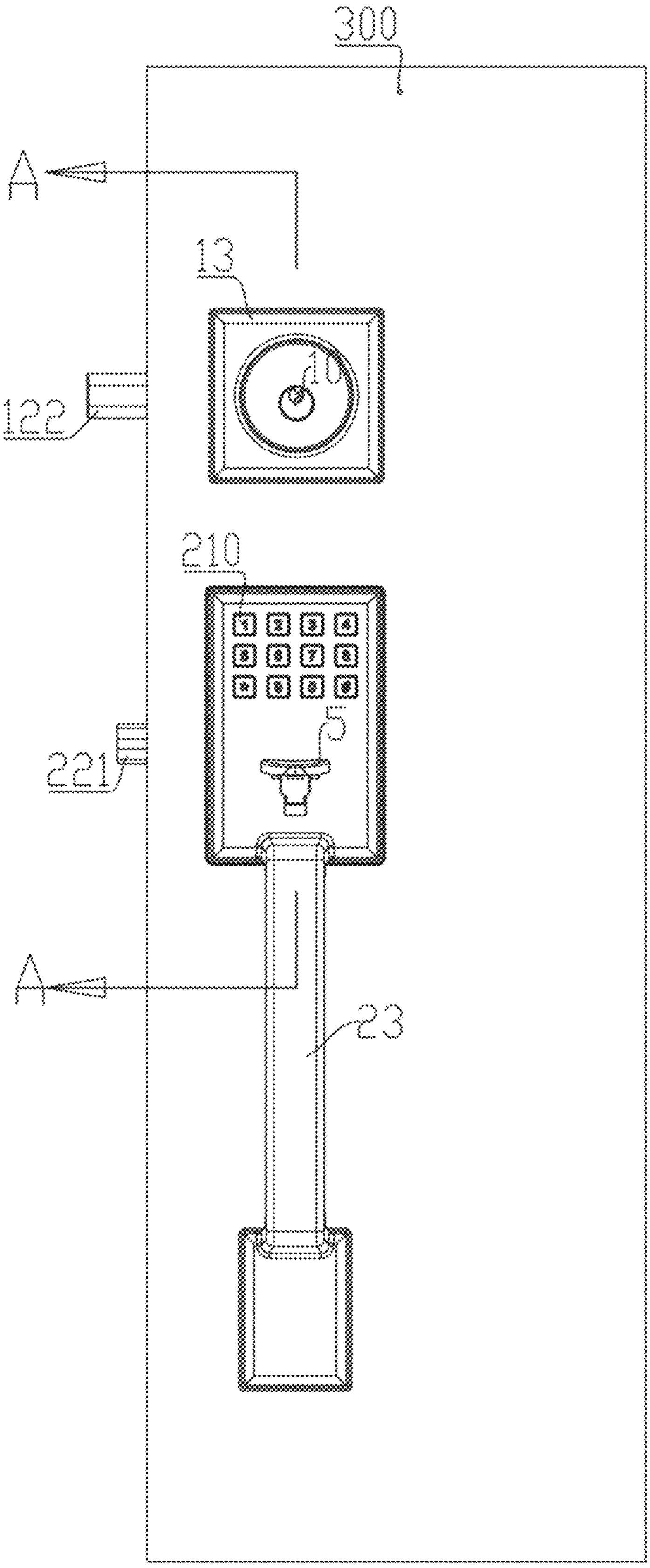
FIG. 2 is a front-view two-dimensional structural diagram of the lockset for locking a door leaf based on the technical solution of the present disclosure.
Figure 3A:
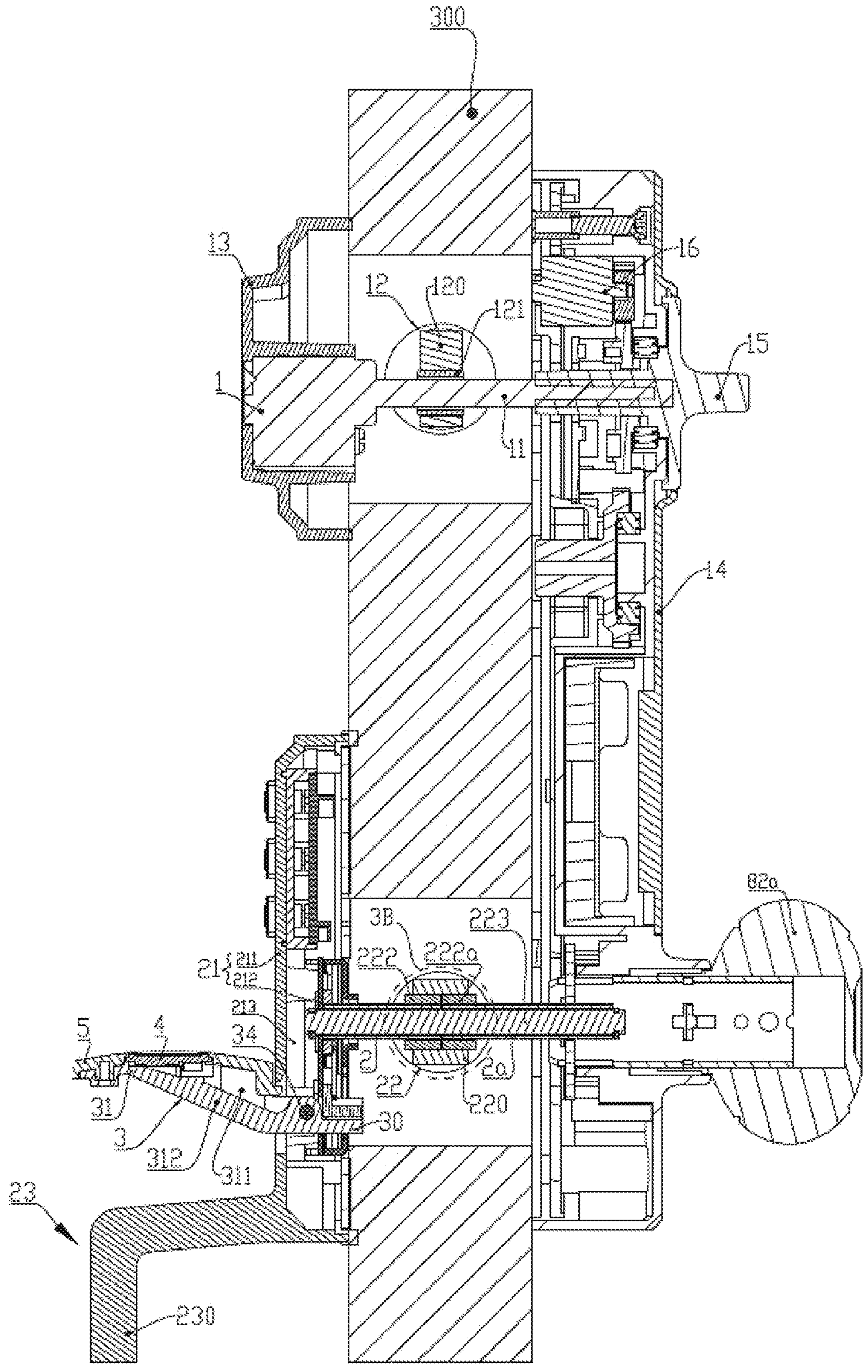
FIGS. 3A-B are a section view taken along line A-A shown in FIG. 2.
Figure 3B:
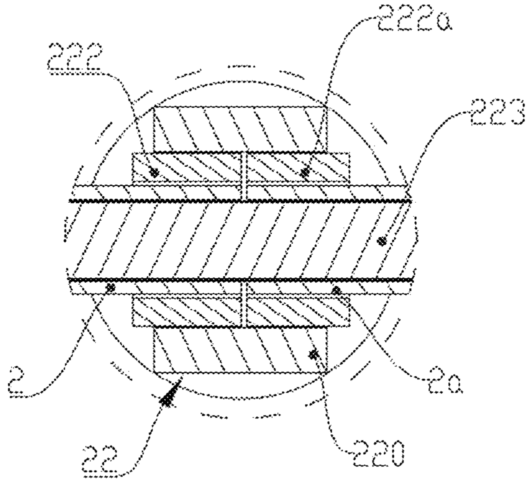

As shown in FIGS. 1 to 3, a lockset for locking a door leaf includes first lock module 100 and second lock module 200. The first lock module 100 includes first lock cylinder 1, transmission shaft 11, and first lock body 12. The first lock body 12 includes first lock case 120, first turning unit 121 with a lever, and first lock bolt 122. The first turning unit 121 is configured to rotate on the first lock case 120 and drive the first lock bolt 122 to extend and retract on the first lock case 120 through the lever. In this implementation, the first lock bolt 122 is a dead bolt. An outer side of the first lock body 12 is provided with first outer panel 13. The first outer panel 13 is provided with a panel hole. A key hole of the first lock cylinder 1 is exposed to the panel hole. An inner side of the first lock body 12 is provided with knob 15. The transmission shaft 11 runs through the first turning unit 121. The transmission shaft 11 includes one end drivingly connected to the first lock cylinder 1 and the other end inserted into the knob 15. The outer side of the first lock body 12 is further provided with inner panel 14. An inner side of the inner panel 14 is provided with first electric driver 16. The first electric driver 16 is drivingly connected to the transmission shaft 11. After receiving a signal to unlock door leaf 300, the first electric driver 16 operates to drive the transmission shaft 11 to rotate. The rotating transmission shaft 11 drives the lever of the first turning unit 121 to rotate, thereby driving the first lock bolt 122 to retract. The first electric driver 16 may be a device such as a motor or an electromagnet that can output a driving force under electrical signal control. After receiving a signal to lock the door leaf 300, the retracted first lock bolt 122 extends to lock the door leaf under the drive of the first electric driver 16. The first lock bolt can also extend to lock the door leaf under the drive of other mechanisms. For example, when the door leaf is properly combined with a door frame, a sensor senses a combination signal and forms a locking signal. Inside the door leaf, when the knob 15 is manually turned to drive the transmission shaft 11 to rotate, the transmission shaft 11 drives the first lock bolt 122 to retract or extend through the lever of the first turning unit 121. Outside the door leaf, when a matching key is manually inserted into the first lock cylinder 1 and turned, the first lock cylinder 1 drives the lever of the first turning unit 121 to rotate through the transmission shaft 11, thereby driving the first lock bolt 122 to retract.

Figure 11:
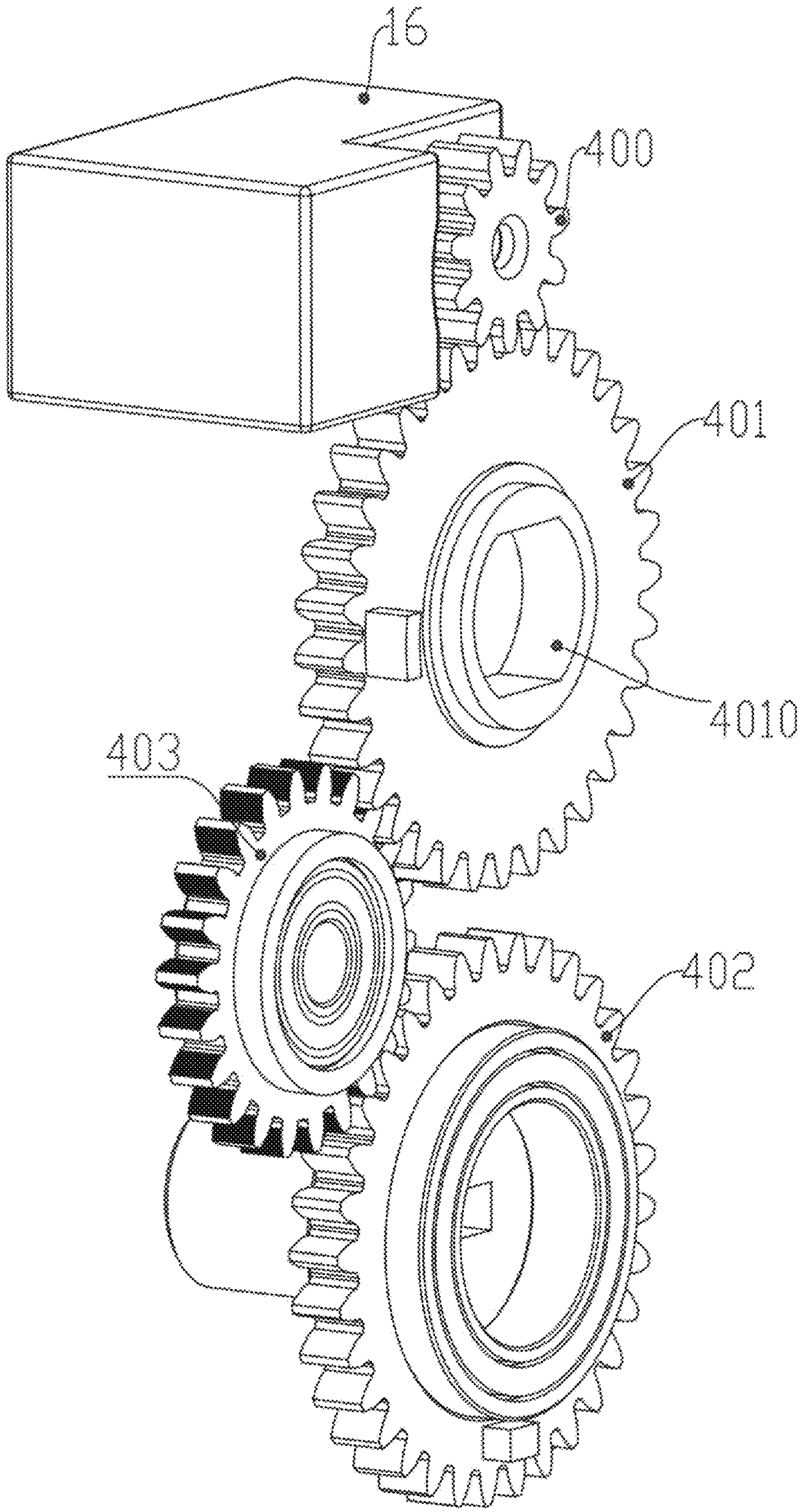
FIG. 11 is a three-dimensional structural diagram of an electric power input device.
Figure 12:
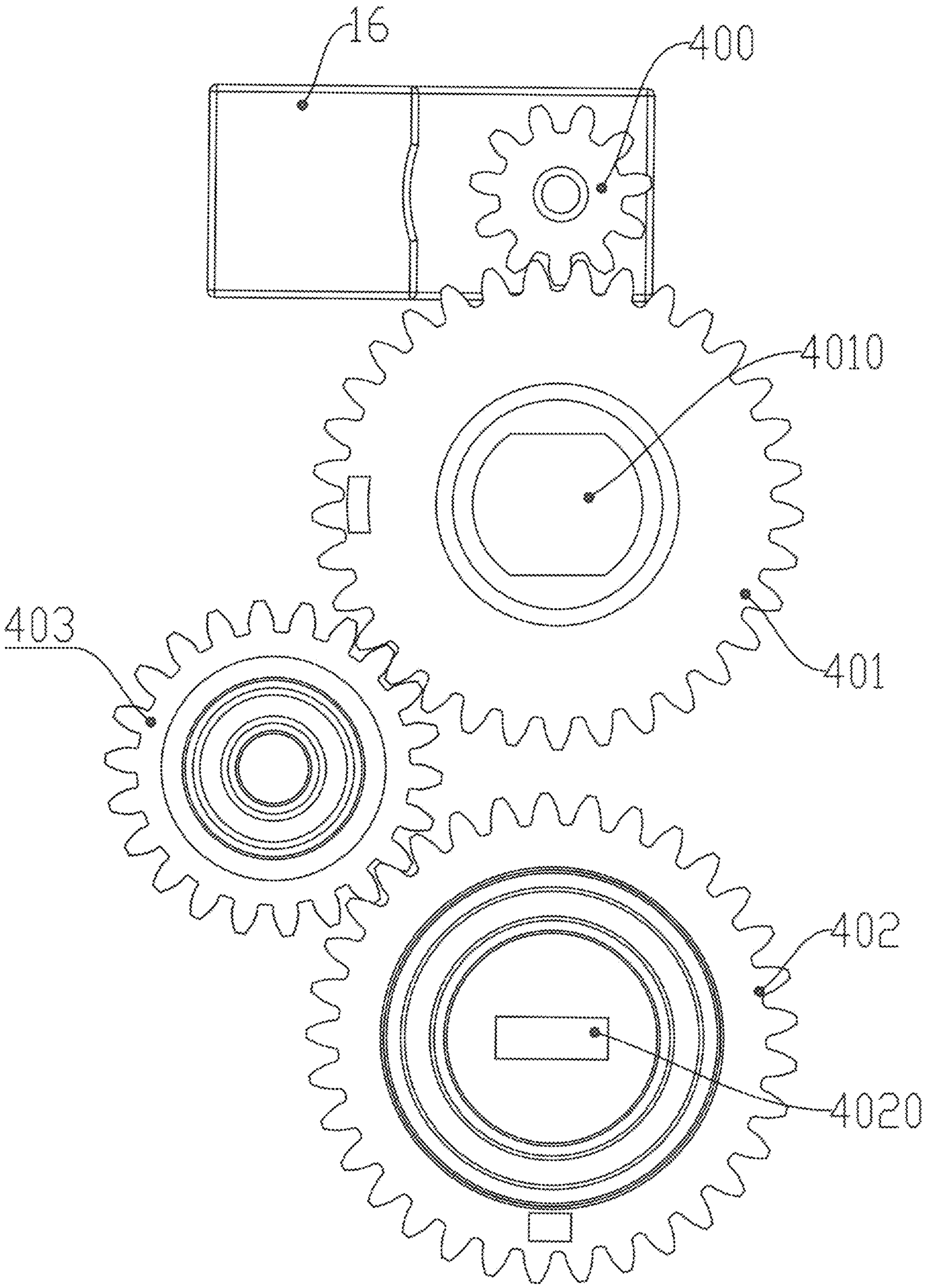
FIG. 12 is a two-dimensional structural diagram of the electric power input device.

The first lock cylinder 1 and the knob 15 are manual power input devices. In different applications, the mounting positions of the manual power input devices are different. In order to meet the requirement, the following solution is further proposed. As shown in FIGS. 11 and 12, the lockset further includes the transmission shaft 11, a manual power input device, and an electric power input device. When the transmission shaft 11 rotates, it drives the first lock bolt 122 to retract. The manual power input device is configured to manually drive the transmission shaft 11 to rotate. The electric power input device is configured to electrically drive the transmission shaft 11 to rotate. The electric power input device includes the first electric driver 16, as well as first transmission wheel 401 and second transmission wheel 402 that rotate separately under the drive of the first electric driver 16. Rotation centerlines of the first transmission wheel 401 and the second transmission wheel 402 are arranged parallel to each other and spaced apart. The transmission shaft 11 is configured to selectively combine with one of the first transmission wheel 401 and the second transmission wheel 402 according to the mounting position of the manual power input device and rotate under the drive of the combined transmission wheel to drive the first lock bolt 122 to retract. Furthermore, the first transmission wheel 401 and the second transmission wheel 402 are gears. Third gear 403 is drivingly meshed between the first transmission wheel 401 and the second transmission wheel 402. The lockset further includes driving gear 400 provided on the first electric driver 16 and configured to rotate under the drive of the first electric driver 16. The driving gear 400 is drivingly meshed with the first transmission wheel 401. The transmission shaft 11 can be a flat iron. In this implementation, a center of the first transmission wheel 401 is provided with pillow-shaped hole 4010. The knob 15 is provided with a rotating shaft that is adapted in terms of shape to the pillow-shaped hole 4010. The rotating shaft is inserted into the pillow-shaped hole 4010. The transmission shaft 11 is inserted into the rotating shaft of the knob 15. A center of the second transmission wheel 402 is provided with square hole 4020. When it is necessary to adjust the first lock cylinder 1 to a position corresponding to the second transmission wheel 402, the transmission shaft 11 is inserted into the square hole 4020 without changing the position of the knob 15. In other implementations, a transmission mechanism is provided between the first electric driver 16 and the first lock bolt 122 to drive the first lock bolt 122 to retract, and another transmission mechanism is provided to drive the first lock bolt 122 to extend.

As shown in FIGS. 1 to 3, the second lock module 200 includes first square iron 2 and second lock body 22. The second lock body 22 includes second lock case 220, second lock bolt 221, and first left turning unit 222 with a lever. One end of the first square iron 2 is radially linked to the first left turning unit 222. The first left turning unit 222 is configured to rotate on the second lock case 220 under the drive of the first square iron 2 and drive the second lock bolt 221 to extend and retract on the second lock case 220 through the lever. When the first lock bolt 122 and the second lock bolt 221 retract, the door leaf is unlocked. On the contrary, when any lock bolt extends, the door leaf is locked. In this implementation, the second lock bolt 221 is a latch bolt. An outer side of the second lock body 22 is provided with second outer panel 21 that is vertically separated from the first outer panel 13. The second outer panel 21 is fixedly provided with outer handle 23. The outer handle 23 includes vertically extending grip portion 230.

Figure 4:
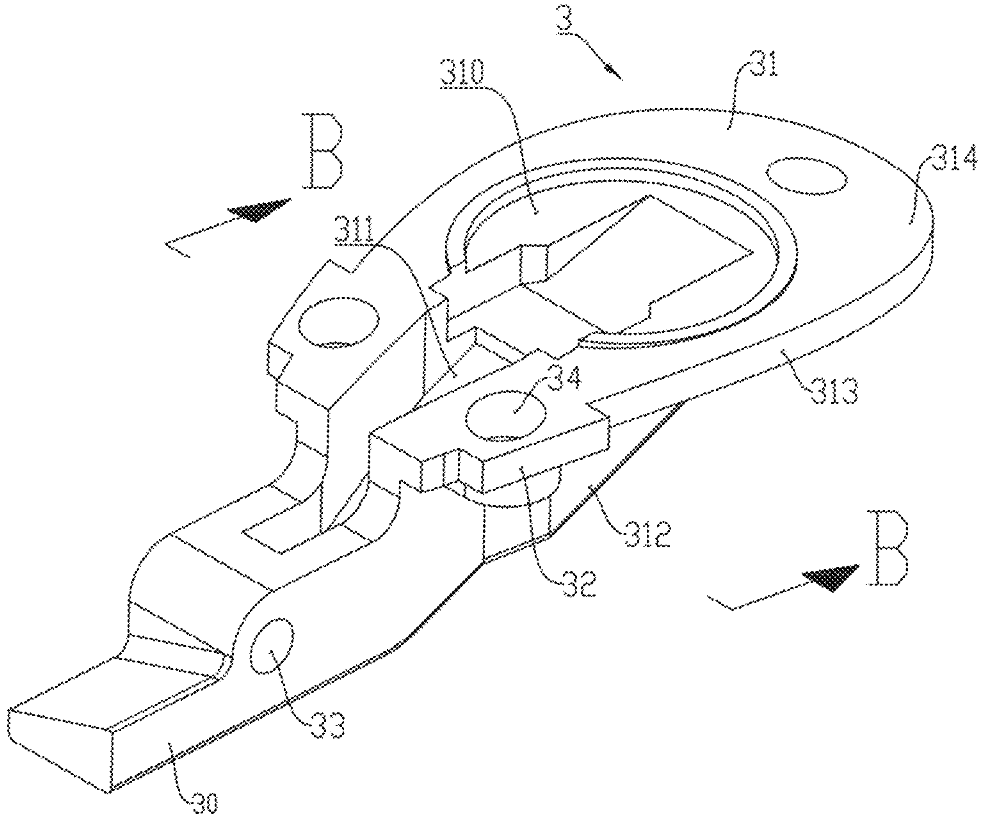
FIG. 4 is a three-dimensional structural diagram of lever component 3.

As shown in FIGS. 3 and 4, the lockset further includes lever component 3 that is operated outside the door leaf to retract the second lock bolt 221. The lever component 3 is configured to tilt around a fulcrum. The lever component 3 includes inner end 30 and outer handle 31. The inner end 30 of the lever component 3 is drivingly connected to the second lock bolt 221. The outer handle 31 of the lever component 3 is configured to receive a pressing action of a hand. When the outer handle 31 of the lever component 3 is pressed, the lever component 3 tilts, allowing the inner end

30 to drive the second lock bolt 221 to retract. The outer handle 31 of the lever component 3 is provided with pickup device 4 for picking up a biological signal of a finger. The pickup device 4 is in electrical signal connection with a controller (not shown in the figure). The controller is configured to control the first electric driver 16 to operate. When the finger exerts the pressing action such that the lever component 3 tilts to retract the second lock bolt 221, the pickup device 4 synchronously picks up the biological signal of the finger that exerts the pressing action. When the picked up biological signal of the finger is determined as an authorized signal, the controller controls the first electric driver 16 to operate to drive the first lock bolt 122 to retract, thereby unlocking the door leaf.

The inner end 30 and the outer handle 31 of the lever component 3 are named after two opposite orientations of the lever component 3. One end of the lever component 3 is named the inner end 30, and the part opposite to the inner end 30 is named the outer handle 31. The structure of the lever component 3 is diverse. For example, the extension directions of the inner end 30 and the outer handle 31 can be parallel or inclined to each other. A transmission device is provided between the inner end 30 and the first square iron 2. The structure of the transmission device is diverse. For example, the inner end 30 is configured to drive a translation rack and a gear meshing in a transmission manner with the rack and radially linked to the first square iron 2. When the lever component 3 is reset, it synchronously drives the second lock bolt 221 to reset. Of course, in other implementations, when the lever component 3 is reset, it may not drive the second lock bolt 221 to reset. Instead, a reset spring is separately provided to drive the second lock bolt 221 to extend and reset.

Figure 5:
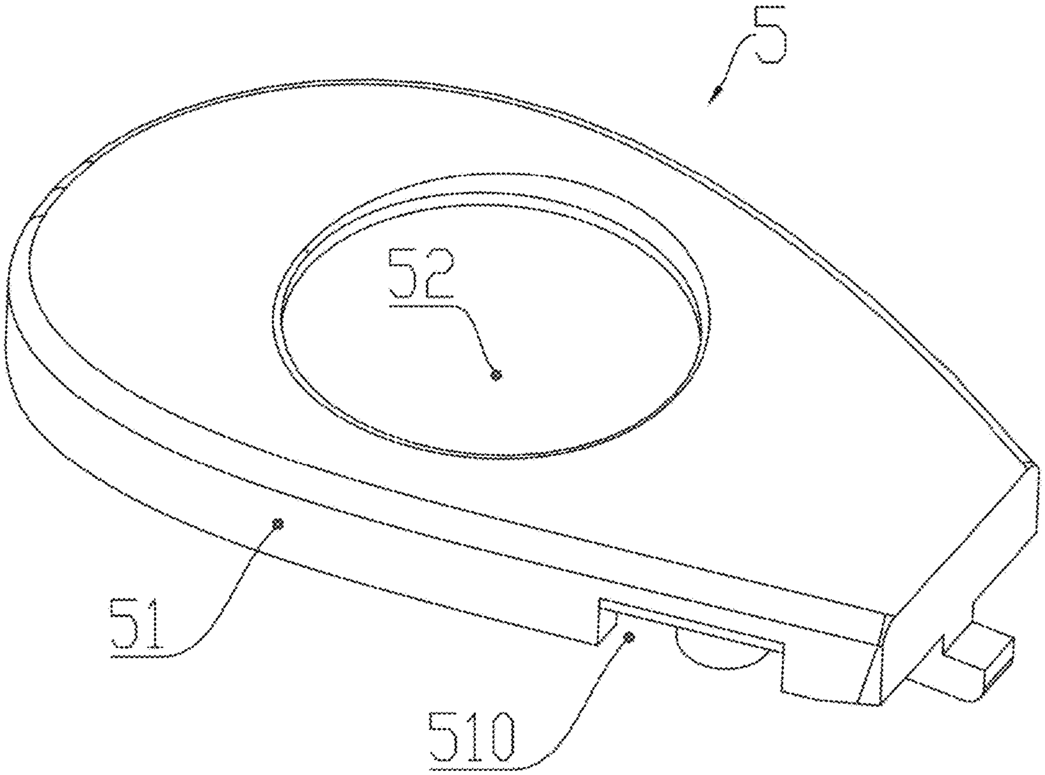
FIG. 5 is a three-dimensional structural diagram of cover plate 5.

As shown in FIGS. 4 and 5, the outer handle 31 of the lever component 3 is provided with accommodating chamber 310. The pickup device 4 is at least partially accommodated in the accommodating chamber 310. The outer handle 31 is provided with groove 311. The groove 311 is communicated with the accommodating chamber 310. The groove 311 extends from the accommodating chamber 310 towards the inner end 30. The lockset further includes cover plate 5. The cover plate 5 covers the groove 311. The groove 311 is configured to house a signal line for transmitting an electrical signal. The lever component 3 and the cover plate 5 are arranged vertically or horizontally. By removing the cover plate 5, the signal line can be conveniently placed in the groove 311. The groove 311 serves as a passage for the signal line, allowing the signal line to be housed between the lever component 3 and the cover plate 5, making it less susceptible to damage. The object to which the signal line is connected changes according to the mounting position of the controller. In this implementation, the controller is housed inside the inner panel 14. The signal line includes one end connected to the pickup device 4 and the other end extending through the groove 311 and connected to the controller. The first electric driver 16 is connected to the controller through another signal line. In other implementations, the controller is housed inside the accommodating chamber 310 and integrated with the pickup device 4. The signal line includes one end connected to the controller and the other end extending through the groove 311 and connected to the first electric driver 16. The pickup device 4 is at least partially accommodated in the accommodating chamber 310, which means that the pickup device 4 is entirely or partially accommodated in the accommodating chamber 310.

Figure 10:
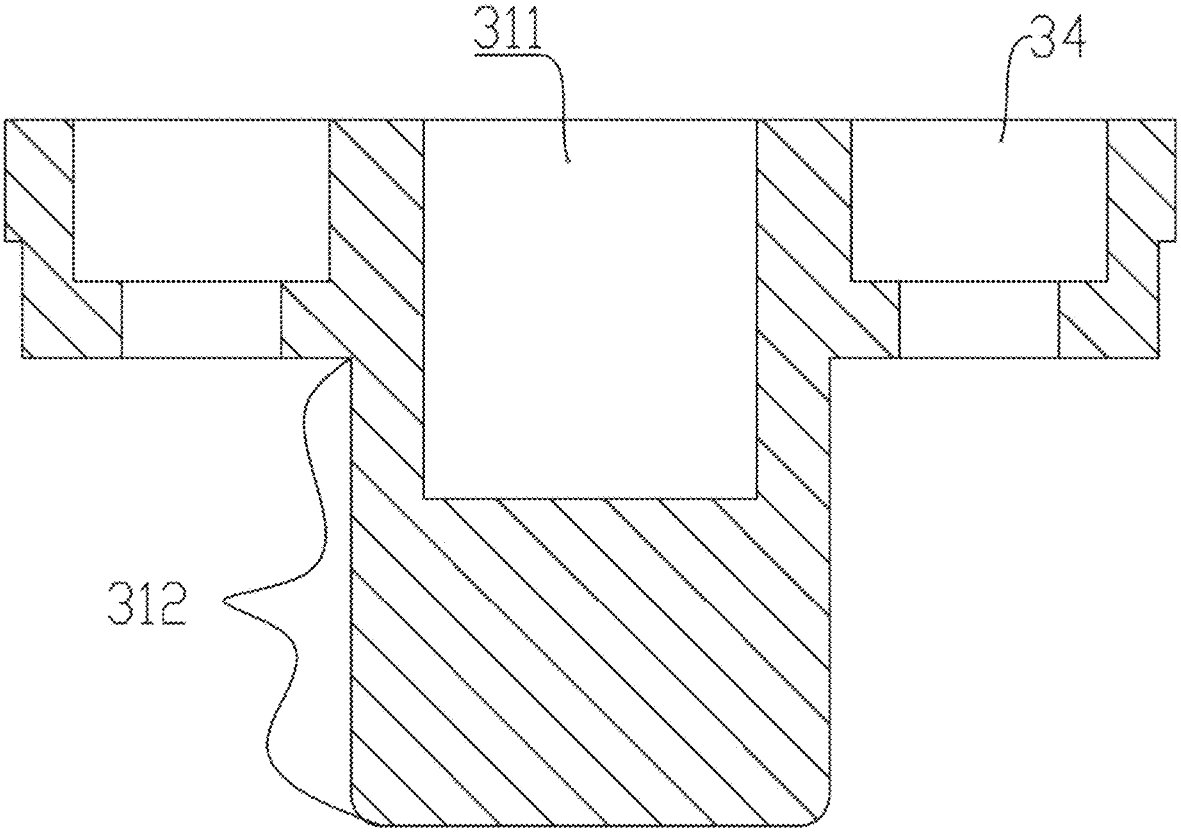
FIG. 10 is a section view taken along line B-B shown in FIG. 4.

As shown in FIG. 10, the accommodating chamber 310 and the groove 311 open upwards. A lower part of the outer handle 31 protrudes downward to form protrusion 312. The protrusion 312 extends from a bottom wall of the accommodating chamber 310 towards the inner end 30, thereby enhancing the structural strength of the lever component 3. From a cross-section of the outer handle 31, the groove 311 extends from an upper surface of the outer handle 31 into the protrusion 312. Furthermore, an upper part of the outer handle 31 is in the shape of a thin plate. The accommodating chamber 310 extends from an upper surface of the outer handle 31 into the protrusion 312. The protrusion 312 serves as a reinforcing rib for the outer handle 31. When the user exerts a pressing force to press the pickup device 4, the protrusion 312 effectively disperses and offsets some of the pressing force, thereby reducing the shaking of the pickup device 4 pressed and extending the service life of the lever component 3. In addition, the protrusion 312 cleverly provides layout space for the groove 311, providing a technical basis for the small-volume design of the lever component 3. The lever component 3 is located directly above the outer handle 23. When four fingers of the hand grip the grip portion 230 of the outer handle 23, the thumb presses the lever component 3. When the first lock bolt 122 and the second lock bolt 221 retract, the outer handle 23 is pushed or pulled to open the door leaf. The operation is seamless and very convenient. Of course, in other implementations, the door leaf may be provided with a motor for driving the door leaf to automatically open. In this case, the outer handle 23 can be omitted. The structure of the groove 311 is diverse. For example, the groove is connected vertically. That is, the groove 311 opens upwards and downwards. In this case, an additional back plate covers a lower opening of the groove 311.

As shown in FIGS. 2 to 4, pivot hole 33 is provided between the inner end 30 and the outer handle 31 of the lever component 3. Pivot shaft 39 is inserted into the pivot hole 33. The pivot shaft 39 is fixedly connected to the second outer panel 21. The lever component 3 tilts with the pivot shaft 39 as a fulcrum. The second outer panel 21 is provided with button module 210. The button module 210 is in electrical signal connection with the controller. The button module 210 is provided with a plurality of buttons. The buttons are configured to pick up a manual button signal. When the picked up button signal is determined as an authorized signal, the controller controls the first electric driver 16 to operate to drive the first lock bolt 122 to retract, thereby unlocking the door leaf. In this way, in addition to the pickup device 4, the button module 210 is configured to pick up the authorized signal. The design provides another additional unlocking method, improving the unlocking convenience and diversity of the lockset, and optimizing user experience.

Furthermore, the second outer panel 21 includes outer trim plate 211 and inner bottom plate 212 located inside the outer trim plate 211. The pivot shaft 39 is fixedly connected to the outer trim plate 211. The button module 210 is located on the outer trim plate 211. Interlayer space 213 is provided between the outer trim plate 211 and the inner bottom plate 212. The signal line extends from the groove 311 and passes through the interlayer space 213.

The cover plate 5 is fixedly connected to the outer handle 31 and covers the accommodating chamber 310. As shown in FIGS. 4 and 5, the cover plate 5 is provided with cover window 52. A top surface of the pickup device 4 is exposed to the cover window 52. The cover plate 5 is bowl-shaped, including rim 51 bent along a side edge. The cover plate 5 wraps around side edge 313 of the outer handle 31 through the rim 51. The rim 51 is provided with positioning notch 510. The side edge 313 of the outer handle 31 is provided with positioning wing 32 that is adapted to the positioning notch 510 and extends horizontally. The positioning wing 32 is inserted into the positioning notch 510. An outer side surface of the positioning wing 32 is basically flush with an outer side surface of the rim 51 of the cover plate 5. The outer handle 31 is provided with connecting hole 34. A portion of the connecting hole 34 extends to the positioning wing 32. A fastening screw passes through the connecting hole 34 and locks onto the cover plate 5. In this way, the positioning notch 510 cooperates with the positioning wing 32 to preliminarily position the cover plate 5. Meanwhile, the positioning wing 32 provides layout space for the connecting hole 34, making the outer handle 31 compact in structure and reducing the material used. The cover plate 5 only covers the upper side edge 313 of the outer handle 31, and the protrusion 312 is exposed. In other implementations, the cover plate 5 can further extend downwards to house the protrusion 312.

In the above technical solution, the position of the pickup device 4 is fixed. However, different users may have different lengths of arms and stand in different positions to unlock the lockset. To make the finger fit to the pickup device 4, the user needs to stretch or curl the finger to adjust the position of the finger, which destroys comfort and reduces the accuracy of the pickup device 4 in picking up the biological signal of the finger. In view of this, the present disclosure further improves the above technical solution and proposes movable pickup device 4. The same parts are marked with the same reference numerals and will not be repeated here. The main differences from the structure shown in FIGS. 4 and 5 are elaborated below.

Figure 6:
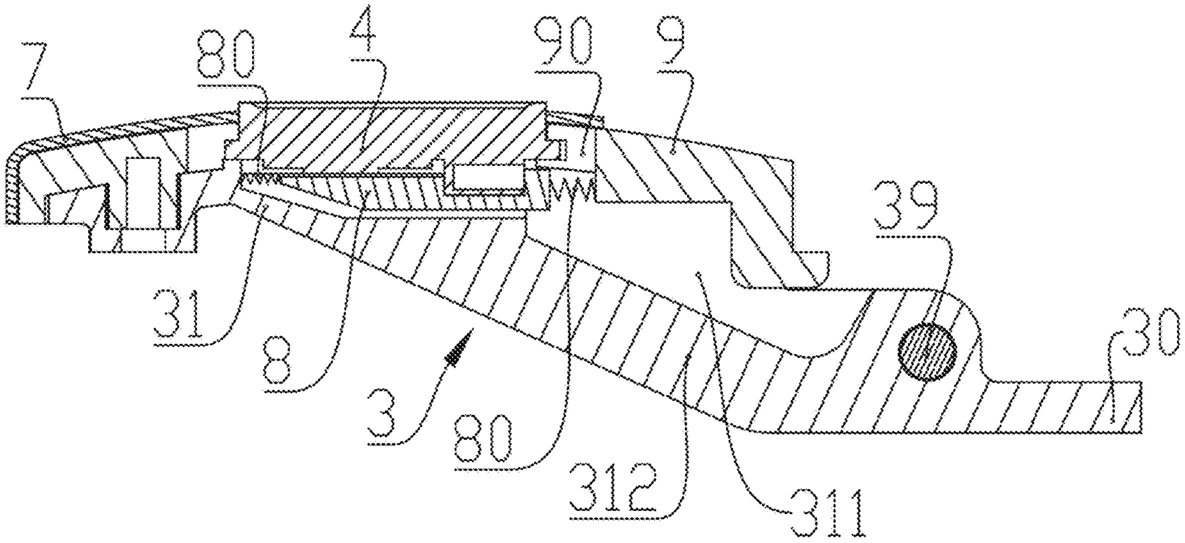
FIG. 6 is a structural diagram of mobile pickup device 4 according to another embodiment of the present disclosure.

As shown in FIG. 6, unlike the structure shown in FIGS. 4 and 5, as a sliding cover plate structure, cover plate 7 is slidably provided on the outer handle 31. A movement direction of the cover plate 7 is identical to an extension direction of the groove 311. The cover plate 7 is provided with a cover window (which is obscured by the pickup device 4 in the figure and therefore not marked). The pickup device 4 is at least partially embedded in the cover window and the top surface of the pickup device 4 is exposed to the cover window. The pickup device 4 is fixed to the cover plate 7 and movable with the cover plate 7. An extension length of the accommodating chamber 310 in the extension direction of the groove 311 is adapted to a stroke of the pickup device 4. Sliding component 8 and reset spring 80 for driving the sliding component 8 to slide and reset are provided in the accommodating chamber 310. The pickup device 4 is fixedly connected to the sliding component 8. Furthermore, the lockset further includes fixed cover plate 9. The fixed cover plate 9 is fixedly provided between the cover plate 7 and the outer handle 31. The fixed cover plate 9 is provided with avoidance hole 90 for avoiding the pickup device 4.

In other embodiments, based on the differences in finger placement angles among different user groups, an elastically compressible support component (not shown in the figure) can further be provided between the pickup device 4 and a bottom wall of the accommodating chamber 310, such that the pickup device 4 can have a slight swing adjustment angle within a certain angle range.

Figure 9:
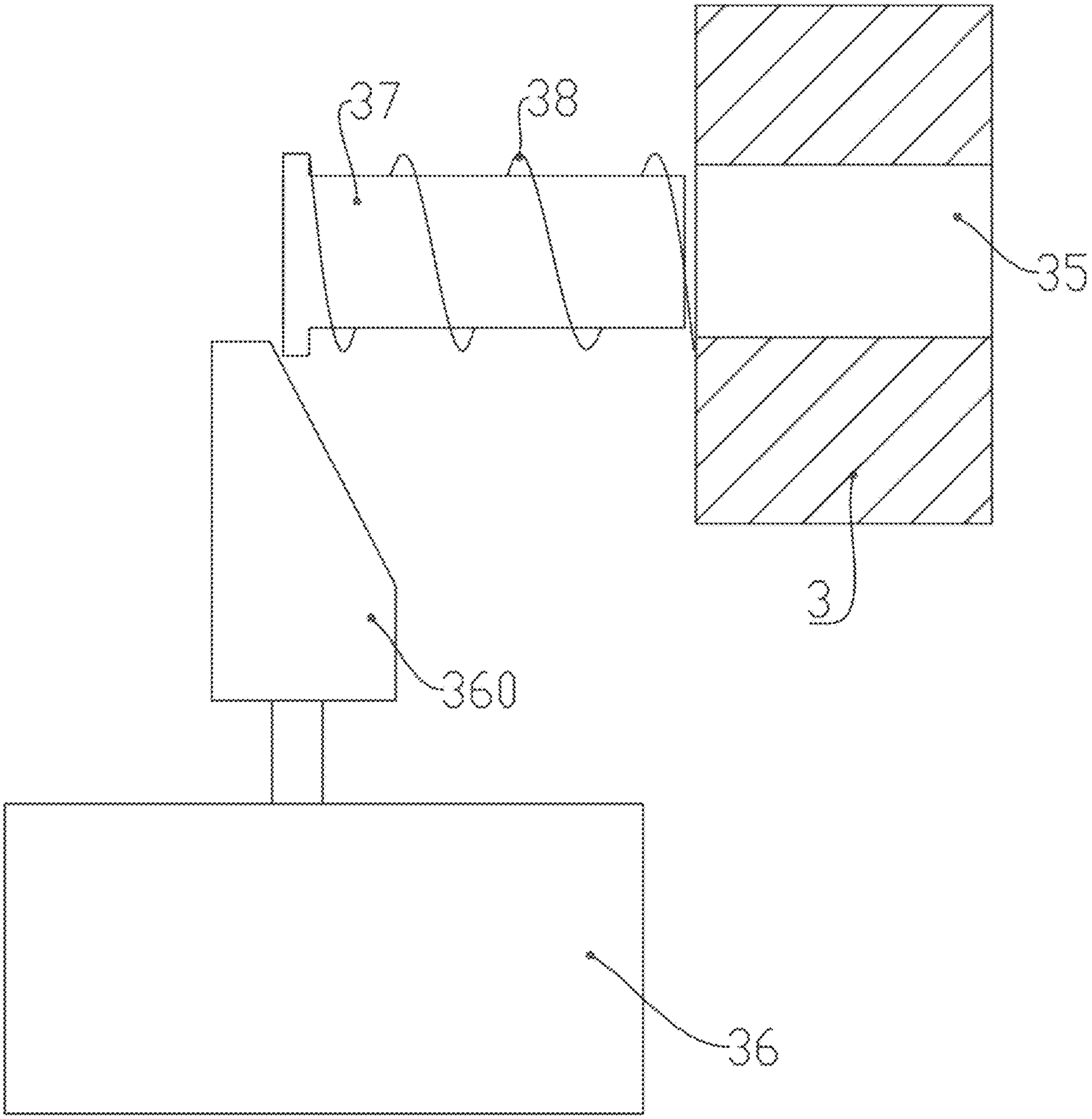
FIG. 9 is a structural diagram of a locking mechanism.

As shown in FIG. 9, the lever component 3 is provided with positioning socket 35. The lockset further includes a locking mechanism for preventing the lever component 3 from tilting. The locking mechanism includes second electric driver 36 in electrical signal connection with the controller, movable pin 37 configured to be inserted into or removed from the positioning socket 35, and elastic member 38 for driving the movable pin 37 to be removed from the positioning socket 35. An output shaft of the second electric driver 36 is connected to pushing element 360 with an inclined pushing surface. The lockset is provided with a guiding structure (not shown in the figure) for guiding the movable pin 37 to extend and retract. In a normal state, the inclined pushing surface of the pushing element 360 presses against the movable pin 37 to remain the movable pin inserted into the positioning socket 35. At this point, the elastic member 38 is in a compressed state. When the picked up biological signal of the finger is determined as an authorized signal, the controller controls the second electric driver 36 to drive the pushing element 360 to move downward, such that the movable pin 37 is removed from the positioning socket 35 under the drive of the elastic member 38, allowing the lever component 3 to be pressed and tilted. When the picked up biological signal of the finger is determined as an unauthorized signal, the second electric driver 36 does not operate, and the movable pin 37 remains inserted into the positioning socket 35 to prevent the lever component 3 from tilting. In this way, the second lock bolt 221 does not retract, and the first lock bolt 122 does not retract either, further enhancing the security of the lockset. The second electric driver 36 may be an electromagnetic displacement drive device, and the elastic member 38 may be a spring.

Figure 7:
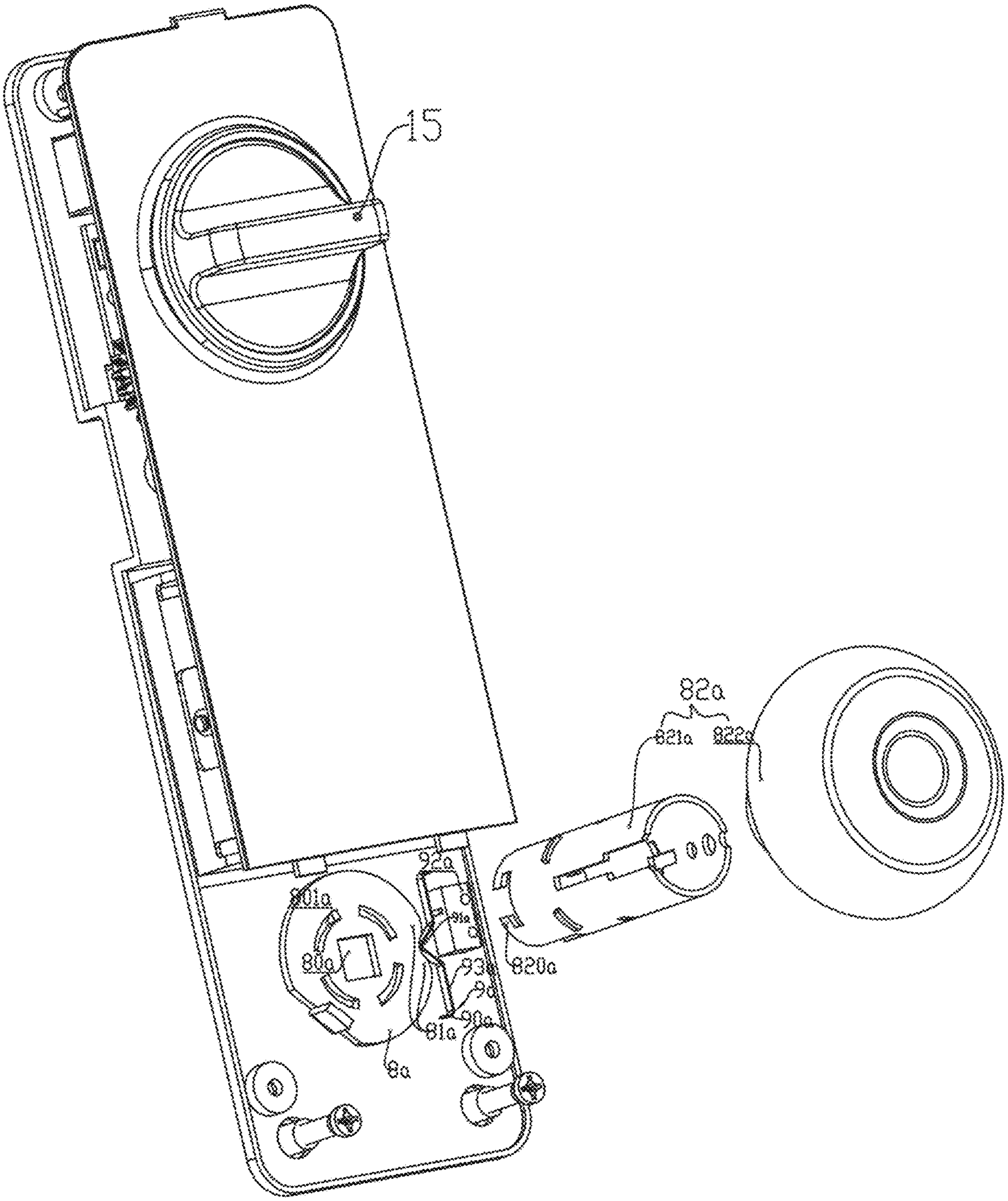
FIG. 7 is an exploded view of an inner handle assembly.
Figure 8:
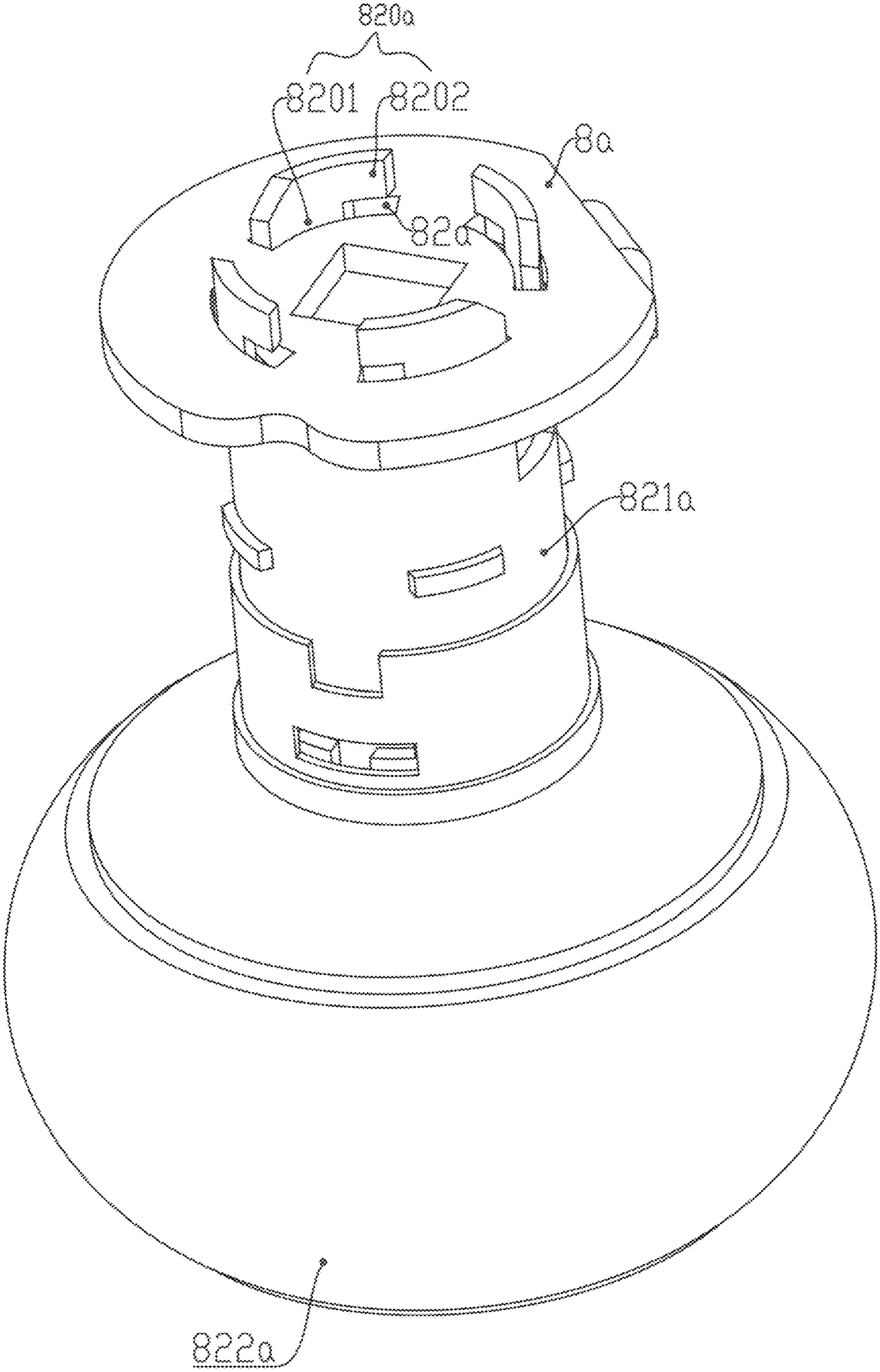
FIG. 8 is a three-dimensional structural diagram of the handle connected to a linkage ring.

As shown in FIGS. 3, 7, and 8, the lockset further includes first square iron 2, second square iron **2*a*, inner handle 82*a*, and trigger switch 92*a*. After the lockset is mounted, the second square iron 2*a* and the first square iron 2 are not linked to each other, and the first square iron 2 and the second square iron 2*a* separately drive the second lock bolt 221. When the first square iron 2 or the second square iron 2*a* rotates, it drives the second lock bolt 221 to retract. The lever component 3 is drivingly connected to the first square iron 2. When the lever component 3 tilts, it drives the first square iron 2 to rotate, thereby driving the second lock bolt 221 to retract. The inner handle 82*a* is provided at an inner side of the door leaf, and the inner handle 82*a* is drivingly connected to the second square iron 2*a*. The trigger switch 92*a* is provided at a side of the inner handle 82*a*, and is configured to respond to a rotation signal of the inner handle 82*a*. The trigger switch 92*a* is in signal connection with the controller. When the inner handle 82*a* rotates, it drives the second square iron 2*a* to rotate, thereby driving the second lock bolt 221 to retract. The trigger switch 92*a* transmits the rotation signal of the inner handle 82*a* to the controller. After receiving the rotation signal, the controller controls the first electric driver 16 to operate to drag the first lock bolt 122 to retract, thereby unlocking the door leaf. After a specific time, such as 10 s, the controller controls the first electric driver 16 to operate again to drag the first lock bolt 122** to extend.

The lockset further includes positioning rod 223 fixed to the inner bottom plate 212. The first square iron 2 and the second square iron **2*a* are hollow, and are fitted onto the positioning rod 223 and rotatable on the positioning rod 223. The second lock body 22 further includes second right turning unit 222*a* with a lever. The second right turning unit 222*a* and the first left turning unit 222 are not linked to each other. One end of the second square iron 2*a* is radially linked to the second right turning unit 222*a* and the other end of the second square iron 2*a* is radially linked to the inner handle 82*a*. When the inner handle 82*a* is turned to drive the second square iron 2*a* to rotate, the second square iron 2*a* drives the lever of the second right turning unit 222*a* to rotate, thereby driving the second lock bolt 221** to retract or extend.

Furthermore, the inner handle 82*a* includes grip portion 822*a* and handle spindle 821*a*. The grip portion 822*a* is detachably connected to the handle spindle 821*a*. The handle spindle 821*a* is provided with connecting claw sets. Each connecting claw set includes a pair of connecting claws 820*a* that form a left-right symmetrical structure. The connecting claw 820*a* is L-shaped, including vertical portion 8201, horizontal portion 8202, and linkage ring 8*a* connected to the inner handle 82*a*. The linkage ring 8*a* is provided with connecting slots 801*a*. One connecting slot 801*a* corresponds to one connecting claw 820*a*. After two connecting claws from the same set are inserted into two adjacent connecting slots 801*a*, the vertical portion of the left connecting claw presses against a left side wall of the left connecting slot, while the vertical portion of the right connecting claw presses against a right side wall of the right connecting slot. The connecting claw 820*a* is bent such that the horizontal portion 8202 overlaps on the linkage ring 8*a*, thereby preventing the linkage ring 8*a* from moving inward in an axial direction to disengage from the handle spindle 821*a*. A pair of connecting claws 820*a* in the same set cooperate with a pair of connecting slots 801*a*, such that the inner handle 82*a* drives the linkage ring 8*a* to rotate. The linkage ring 8*a* is provided with ring hole 80A. The other end of the second square iron 2*a* extends into the ring hole 80A and is drivingly connected to the linkage ring 8*a*. When the inner handle 82*a* rotates, the linkage ring 8*a* rotates accordingly, and the rotating linkage ring 8*a* drives the second square iron 2*a* to rotate. The inner handle 82*a*, the linkage ring 8*a*, and the trigger switch 92*a* form an inner handle assembly.

In this implementation, the linkage ring 8*a* further adopts the following structure. An outer edge of the linkage ring 8*a* is provided with a pair of circumferentially spaced radial protrusions 81*a*. A radially sunk recess is formed between the pair of radial protrusions 81*a*. The lockset further includes spring plate 9*a*. The spring plate 9*a* is located between the linkage ring 8*a* and the trigger switch 92*a*. The spring plate 9*a* includes a pair of fixed legs 90*a* and spring body 93*a* connected between the pair of fixed legs 90*a*. The spring body 93*a* is provided with touch portion 91*a* bent towards the recess. The touch portion 91*a* extends into the recess. When the inner handle 82*a* is rotated in either a forward or reverse direction, the linkage ring 8*a* rotates and presses against the touch portion 91*a* through one of the radial protrusions 81*a*, causing the spring plate 9*a* to deform and trigger the trigger switch 92*a* to transmit the rotation signal of the handle to the controller. The lockset further includes a torsion spring (not shown in the figure) for driving the linkage ring 8*a* to rotate and reset. When the hand releases the inner handle 82*a*, the torsion spring drives the linkage ring 8*a* to rotate and reset. Meanwhile, the linkage ring 8*a* drives the second square iron 2*a* to rotate, thereby driving the second lock bolt 221 to extend.

In other implementations, a rotary handle (not shown in the figure) can be used instead of the lever component 3. The pickup device 4 is provided on the rotary handle. The rotary handle is drivingly connected to the second lock bolt 221. When the rotary handle rotates, the second lock bolt 221 retracts. Meanwhile, the pickup device 4 picks up the biological signal of the finger that exerts the rotation action. When the picked up biological signal of the finger is determined as an authorized signal, the controller controls the first electric driver 16 to operate to drive the first lock bolt 122 to retract, thereby unlocking the door leaf. The rotary handle can be a spherical or L-shaped handle.

What is claimed is:

1. A lockset for locking a door leaf, comprising:

a first lock bolt and a second lock bolt, wherein when the first lock bolt and the second lock bolt retract, the door leaf is unlocked;

a first electric driver, wherein when the first electric driver operates, the first lock bolt is driven to retract; and a lever component, wherein the lever component is operated outside the door leaf to retract the second lock bolt;

wherein the lever component is configured to tilt around a fulcrum, and the lever component comprises an inner end and an outer handle; the inner end of the lever component is drivingly connected to the second lock bolt; the outer handle of the lever component is configured to receive a pressing action of a hand; when the outer handle of the lever component is pressed, the lever component tilts, allowing the inner end to drive the second lock bolt to retract; the outer handle of the lever component is provided with a pickup device for picking up a biological signal of a finger; the pickup device is in electrical signal connection with a controller; the controller is configured to control the first electric driver to operate; when the finger exerts the pressing action such that the lever component tilts to retract the second lock bolt, the pickup device synchronously picks up the biological signal of the finger; and when the biological signal of the finger is determined as an authorized signal, the controller controls the first electric driver to operate to drive the first lock bolt to retract, thereby unlocking the door leaf.

2. The lockset for locking the door leaf according to claim 1, wherein the outer handle of the lever component is provided with an accommodating chamber; the pickup device is at least partially accommodated in the accommodating chamber; the outer handle is provided with a groove; the groove is communicated with the accommodating chamber, and the groove extends from the accommodating chamber towards the inner end; the lockset further comprises a cover plate, and the cover plate covers the groove; and the groove is configured to house a signal line for transmitting an electrical signal.

3. The lockset for locking the door leaf according to claim 2, wherein the accommodating chamber and the groove open upwards; a lower part of the outer handle protrudes downward to form a protrusion; the protrusion extends from a bottom wall of the accommodating chamber towards the inner end, thereby enhancing a structural strength of the lever component; and from a cross-section of the outer handle, the groove extends from an upper surface of the outer handle into the protrusion.

4. The lockset for locking the door leaf according to claim 3, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

5. The lockset for locking the door leaf according to claim 2, wherein the cover plate is fixedly connected to the outer handle, and the cover plate is provided with a cover window;

a top surface of the pickup device is exposed to the cover window; the cover plate is bowl-shaped, comprising a rim bent along a side edge; and the cover plate wraps around a side edge of the outer handle through the rim.

6. The lockset for locking the door leaf according to claim 5, wherein the rim is provided with a positioning notch; the side edge of the outer handle is provided with a positioning wing, wherein the positioning wing is adapted to the positioning notch and extends horizontally; the positioning wing is inserted into the positioning notch; and an outer side surface of the positioning wing is basically flush with an outer side surface of the rim of the cover plate.

7. The lockset for locking the door leaf according to claim 6, wherein the outer handle is provided with a connecting hole; a portion of the connecting hole extends to the positioning wing; and a fastening screw passes through the connecting hole and locks onto the cover plate.

8. The lockset for locking the door leaf according to claim 7, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

9. The lockset for locking the door leaf according to claim 6, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

10. The lockset for locking the door leaf according to claim 5, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

11. The lockset for locking the door leaf according to claim 2, wherein the cover plate is slidably provided on the outer handle; a movement direction of the cover plate is identical to an extension direction of the groove; the cover plate is provided with a cover window; the pickup device is at least partially embedded in the cover window, and a top surface of the pickup device is exposed to the cover window; the pickup device is fixed to the cover plate and movable with the cover plate; and an extension length of the accommodating chamber in the extension direction of the groove is adapted to a stroke of the pickup device.

12. The lockset for locking the door leaf according to claim 11, wherein a sliding component and a reset spring for driving the sliding component to slide and reset are provided in the accommodating chamber; and the pickup device is fixedly connected to the sliding component.

13. The lockset for locking the door leaf according to claim 12, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

14. The lockset for locking the door leaf according to claim 11, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

15. The lockset for locking the door leaf according to claim 2, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

16. The lockset for locking the door leaf according to claim 1, further comprising an outer panel; wherein a pivot hole is provided between the inner end and the outer handle of the lever component; a pivot shaft is inserted into the pivot hole; the pivot shaft is fixedly connected to the outer panel; the lever component is configured to tilt with the pivot shaft as the fulcrum; the outer panel is provided with a button module; the button module is in electrical signal connection with the controller; the button module is provided with a plurality of buttons; the plurality of buttons are configured to pick up a manual button signal; and when the manual button signal is determined as an authorized signal, the controller controls the first electric driver to operate to drive the first lock bolt to retract, thereby unlocking the door leaf.

17. The lockset for locking the door leaf according to claim 16, wherein the outer panel comprises an outer trim plate and an inner bottom plate located inside the outer trim plate; the pivot shaft is fixedly connected to the outer trim plate; the button module is located on the outer trim plate; an interlayer space is provided between the outer trim plate and the inner bottom plate; and the signal line extends from the groove and passes through the interlayer space.

18. The lockset for locking the door leaf according to claim 1, further comprising a first square iron, a second square iron, an inner handle, and a trigger switch; wherein after the lockset is mounted, the second square iron and the first square iron are not linked to each other, and the first square iron and the second square iron separately drive the second lock bolt; when rotating, the first square iron or the second square iron drives the second lock bolt to retract; the lever component is drivingly connected to the first square iron; when tilting, the lever component drives the first square iron to rotate, thereby driving the second lock bolt to retract; the inner handle is provided at an inner side of the door leaf, and the inner handle is drivingly connected to the second square iron; the trigger switch is provided at a side of the inner handle, and the trigger switch is configured to respond to a rotation signal of the inner handle; the trigger switch is in signal connection with the controller; when rotating, the inner handle drives the second square iron to rotate, thereby driving the second lock bolt to retract, and the trigger switch transmits the rotation signal of the inner handle to the controller; and after receiving the rotation signal, the controller controls the first electric driver to operate to drag the first lock bolt to retract, thereby unlocking the door leaf.

19. The lockset for locking the door leaf according to claim 1, further comprising:

a transmission shaft for rotating to drive the first lock bolt to retract;

a manual power input device for manually driving the transmission shaft to rotate; and an electric power input device for electrically driving the transmission shaft to rotate;

wherein the electric power input device comprises the first electric driver, a first transmission wheel and a second transmission wheel, wherein the first transmission wheel and the second transmission wheel rotate separately under a drive of the first electric driver; rotation centerlines of the first transmission wheel and the second transmission wheel are arranged parallel to each other and spaced apart; and the transmission shaft is configured to selectively combine with one of the first transmission wheel and the second transmission wheel according to a mounting position of the manual power input device and rotate under a drive of the combined transmission wheel to drive the first lock bolt to retract.

20. The lockset for locking the door leaf according to claim 19, wherein the first transmission wheel and the second transmission wheel are gears; a third gear is drivingly meshed between the first transmission wheel and the second transmission wheel; the lockset further comprises a driving gear provided on the first electric driver and configured to rotate under a drive of the first electric driver; and the driving gear is drivingly meshed with the first transmission wheel.

* * * * *